United States Patent [19]

Nagano

[11] Patent Number: 5,052,241
[45] Date of Patent: Oct. 1, 1991

[54] STEERING HANDLE APPARATUS FOR USE IN BICYCLE

[75] Inventor: Masashi Nagano, Osaka, Japan

[73] Assignee: Shimano Industrial Co., Ltd., Osaka, Japan

[21] Appl. No.: 386,187

[22] Filed: Jul. 28, 1989

[30] Foreign Application Priority Data

Jul. 29, 1988 [JP] Japan .................. 63-190952
Dec. 27, 1988 [JP] Japan .................. 63-334830

[51] Int. Cl.$^5$ ............................................. F16C 1/10
[52] U.S. Cl. ............................. 74/502.2; 74/475; 74/489
[58] Field of Search ............... 74/475, 489, 502.2

[56] References Cited

U.S. PATENT DOCUMENTS

| 4,325,267 | 4/1982 | Kojima | 74/475 |
| 4,343,201 | 8/1982 | Shimano | 74/489 |
| 4,473,077 | 9/1984 | Noiles et al. | 74/502.2 |
| 4,658,667 | 4/1987 | Schuller | 74/502.2 |
| 4,840,081 | 6/1989 | Nagano | 74/502.2 |

FOREIGN PATENT DOCUMENTS

2574364 6/1986 France .
60-149485 10/1985 Japan .
61-143275 6/1986 Japan .
2099961 12/1982 United Kingdom .
2169065 12/1984 United Kingdom .

*Primary Examiner*—Allan D. Herrmann
*Assistant Examiner*—Winnie Yip
*Attorney, Agent, or Firm*—Edwin E. Greigg; Ronald E. Greigg

[57] ABSTRACT

A steering handle apparatus for use in a bicycle includes a handle bar and a change-speed lever apparatus for effecting a change-speed operation with a forward operation or a return operation to a home position of its control lever. The control lever is disposed, in the home position, on a side of the handle bar opposed to the other side contacting interdigital pads of a rider's hand gripping the grip portion of the handle bar. Further, the control lever extends towards the grip portion, and the forward operation on this control lever is effected in a direction aligned with a bending direction of the rider's thumb. The improved bicycle steering handle apparatus assures the rider or greater safety by always providing the rider with a good gripping condition and of easier control lever operation.

9 Claims, 7 Drawing Sheets

STEERING HANDLE APPARATUS FOR USE IN BICYCLE

RELATED PATENT APPLICATION

Application Ser. No. 07/386,372 filed July 28, 1989, is copending with this application.

BACKGROUND OF THE INVENTION

1. Field of the Invention

The present invention relates to a steering handle apparatus for use in a bicycle, and more particularly to a steering handle apparatus of the above type including, in the vicinity of its grip portion, a change-speed lever apparatus for effecting a change-speed operation with a forward operation on a control lever or with a return operation on the same to its home position.

2. Description of the Related Arts

A bicycle steering handle apparatus of the above-described type is known from e.g. a Japanese laid-open patent No. 61-143275. In this apparatus, the control lever pivotable about a vertical shaft and attached to one lateral side of the steering handle bar extends, at its home position, on the side of the handle bar contacting the interdigital areas of the rider's hand gripping a grip portion of the handle, i.e. on the upside of the grip portion.

In general, the handle gripping condition during a bicycle run depends largely on the four fingers other than the thumb of the rider's hand. Accordingly, when the rider operates the control lever while gripping the steering handle, it is desirable that he may use his thumb which is less important for the handle gripping.

However, with the above-described conventional construction, if the rider is to use his thumb to operate the control lever while gripping the handle, his thumb must be lifted up by a significant degree. Then, such considerable lifting-up motion of the thumb destroys the handle-gripping palm loop formed by the thumb and the other four fingers and the gripping condition becomes insufficient, such that the rider's hand tends to slip off the handle thereby to endanger the rider.

Moreover, such lift-up motion of the thumb per se is not desirable in the view point of human engineering and therefore makes the change-speed operation rather clumsy and difficult.

Thus, the primary object of the present invention is to provide an improved bicycle steering handle apparatus which can assure the rider of greater safety by always providing the rider with a good gripping condition and of easier control lever operation.

SUMMARY OF THE INVENTION

In order to accomplish the above-described object, according to a steering handle apparatus of the invention for use in a bicycle, the apparatus comprises: a handle bar; and a change-speed lever apparatus attached to a vicinity of a grip portion of the handle bar, said lever appartus including a change-speed control lever for effecting a change-speed operation with a forward operation or a return operation thereof to its home position; wherein said control lever is disposed, in the home position, on a side of the handle bar opposed to the other side contacting interdigital areas of a rider's hand gripping the grip portion of the handle bar, said control lever extending towards the grip portion, said forward operation on the control lever being effected in a direction aligned with a bending direction of the rider's thumb.

With the above construction, since the control lever is disposed adjacent the thumb of the rider's hand gripping the grip portion of the handle bar, the rider may operate the control lever with his thumb without significantly lifting up the same. Further, since the rider can easily effect this change-speed operation simply by bending his thumb contacting the lever, he can substantially maintain his handle-gripping palm loop in the course of change-speed operation. Accordingly, it becomes possible to significantly reduce the accident of inadvertent slipping of hand away from the handle grip. Even if such slipping accident should occur, the rider can safely cope with the same by immediately holding the grip portion with his thumb positioned at the lower side of the grip portion. In this sense, the apparatus of the invention has significantly improved the rider's safety.

Moreover, since the rider can operate the control lever simply by bending his thumb without significantly lifting up the same, the apparatus permits easy control lever operation which is desirable in the view point of human engineering.

As described above, the apparatus of the invention has achieved the intended object of providing an improved bicycle steering handle apparatus which can assure the rider of greater safety by always providing the rider with a good gripping condition and of easier control lever operation.

Further and other objects, features and effects of the invention will become apparent from the following more detailed description of the embodiments of the invention with reference to the accompanying drawings.

BRIEF DESCRIPTION OF THE DRAWINGS

FIGS. 1 through 10 illustrate preferred embodiments of the present invention; in which.

DESCRIPTION OF THE PREFERRED EMBODIMENTS

Preferred embodiments of the present invention will be particularly described hereinafter with referece to the accompanying drawings.

Figure 1:
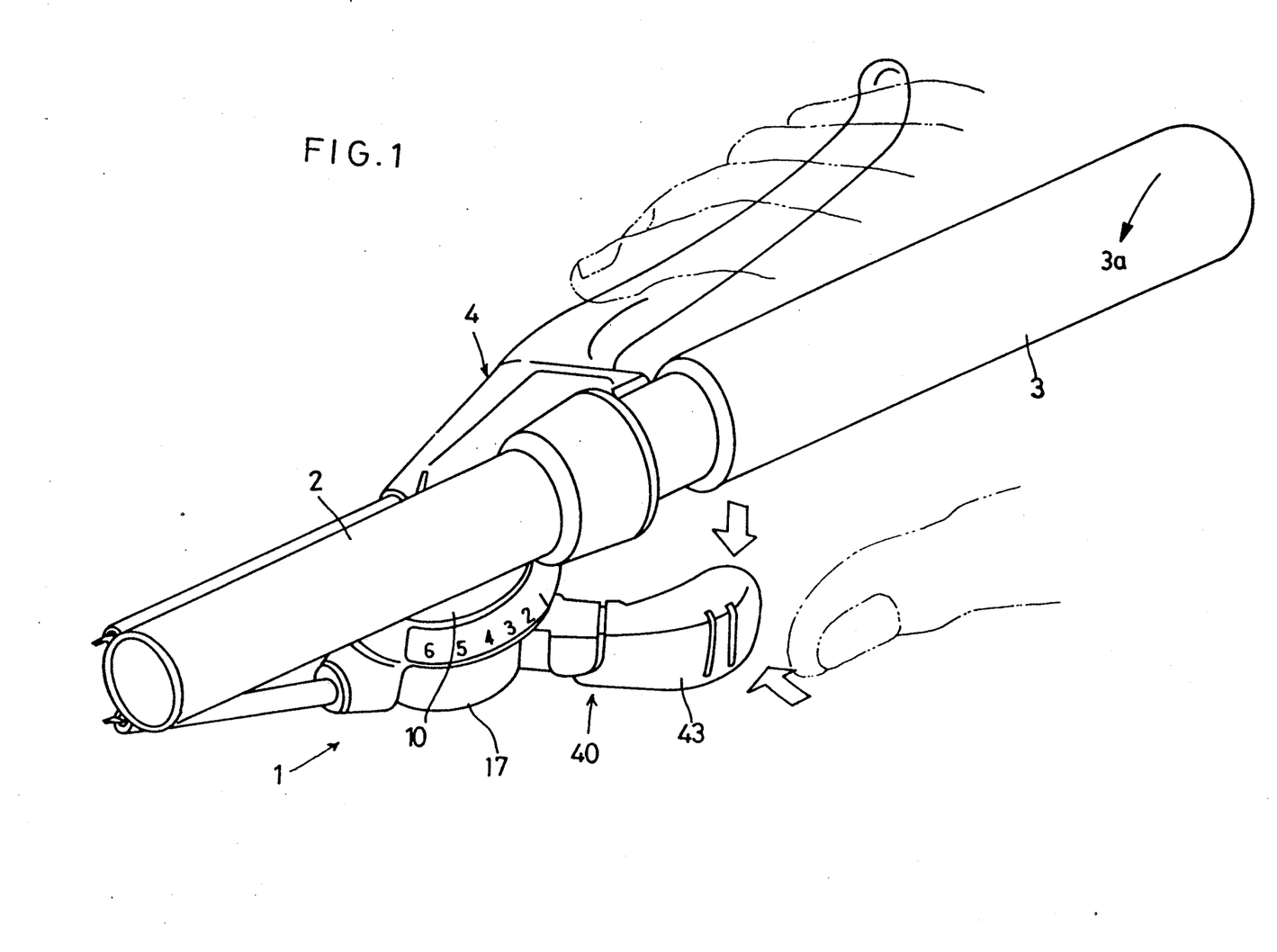
FIG. 1 is a perspective view of a steering handle apparatus for use in a bicycle.

FIG. 1 is a perspective view of a steering handle apparatus for use in a bicycle. This steering handle apparatus includes a change-speed lever apparatus 1 and a steering handle bar 2. The change-speed lever apparatus 1 of this particular embodiment is adapted for use in a five to six step speed rear derailleur.

The steering handle bar 2 comprises a hollow metal tube having a grip portion 3 on which a grip element formed of a resin material is fitted, and the handle bar 2 has its central axis, at the grip portion 3, extending normal to the travelling direction of the bicycle and substantially parallel with the horizontal plane. When the rider holds thus-constructed grip portion 3 of the handle bar 2, the interdigital areas 3a of his handle-gripping hand are placed in contact with the upside face of the handle bar 2 while his thumb is positioned on the downside face of the same.

With the above change-speed lever apparatus, as will be more particularly described later, if a control portion 43 of a control lever 40 is operated in the forward direction from its home position, a winding member 20 is pivoted in a cable-winding direction (to be briefly referred to as a winding direction hereinafter) to wind a change-speed control cable by a predetermined amount. Reversely, if the control portion 43 is released in the opposite direction by a small amount, the winding member 20 is pivoted in the opposite cable-rewinding direction (to be briefly referred to as a rewinding direction hereinafter) to rewind the cable by a predetermined amount.

Though unillustrated, the rear derailleur is operable to effect a change speed through a movement of a chain guide by causing the chain guide to pivot relative to a fixed member on the bicycle body side via a quadrople link mechanism. In this rear derailleur, the chain guide is normally positioned at a high-speed sprocket by means of an urging force of a derailleur spring attached to the link mechanism. Then, if the quadrople link mechanism is pulled via the cable against the urging force of the spring, the derailleur effects a change speed to a lower speed position.

In the above-described construction, the change-speed lever apparatus 1 is attached to a lower side position of the handle bar 2 in the vicinity of the grip portion 3. Further, the control lever 40 extends, at its home position, at the lower side of the grip portion 3 so as to allow the rider to operate the control lever 40 solely by the thumb of his hand gripping the grip portion 3. Also, a first shaft 11, which constitutes the pivotal center of the control lever 40 and will be more particularly described later, is disposed substantially normal to the axis of the steering handle bar 2, such that the winding member 20 may be operated in the winding direction with a forward operation on the control portion 43 of the lever 40 along the thumb-bending direction on the horizontal plane. Moreover, a part of the control lever 40 is adapted to be pivotable also about a second shaft 46 in a plane substantially normal to the first shaft 11, such that the winding member 20 may be pivoted in the rewinding direction with a vertical release operation on the control portion 43. Accordingly, the change-speed operation may be effected without significantly destroying the handle-gripping loop formed by the thumb and the other four fingers in the handle-gripping condition.

Figure 2:
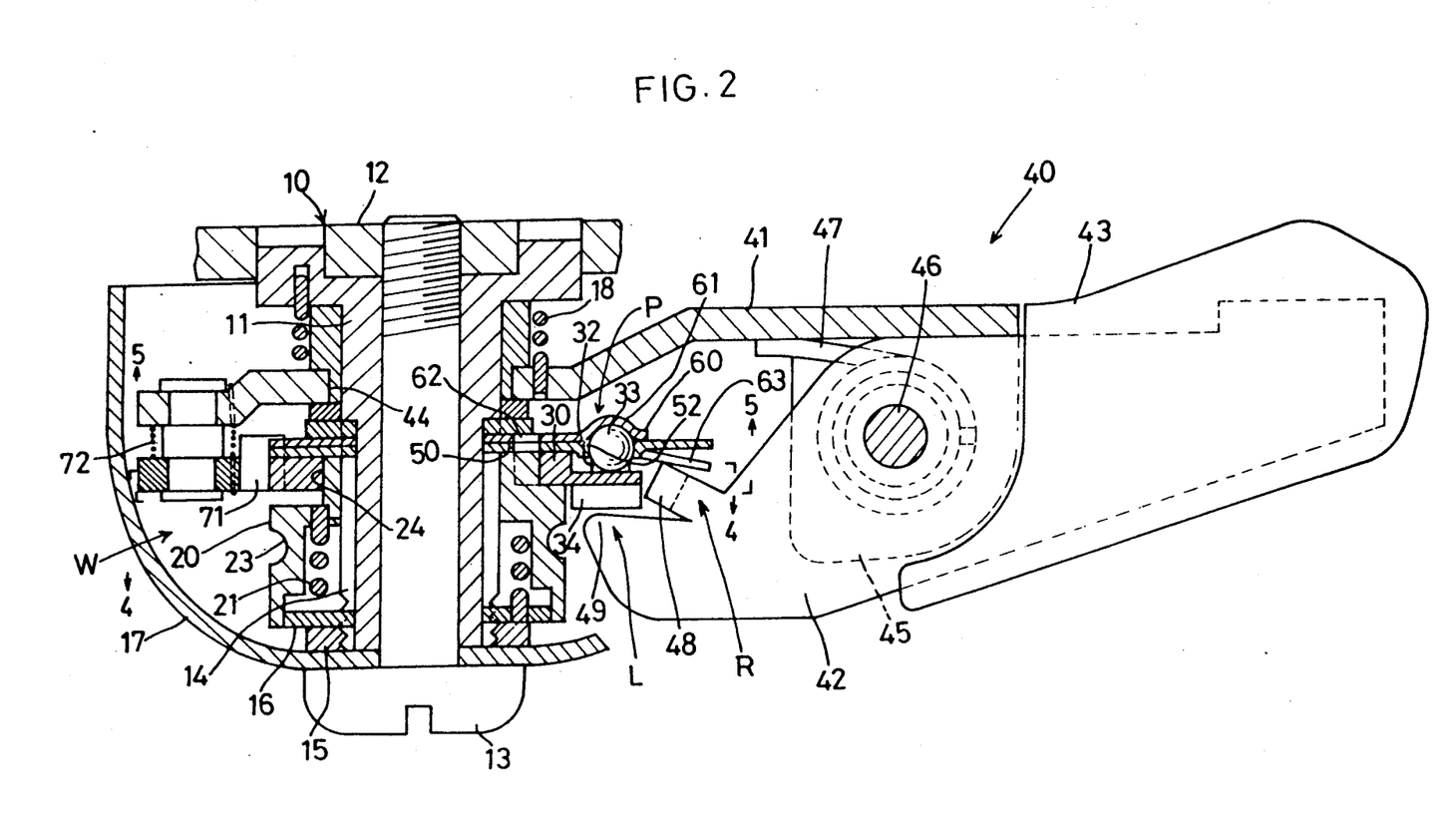
FIG. 2 is a partially cutaway cross section showing a change-speed lever apparatus according to one preferred embodiment of the invention.

As shown in FIG. 2, a fixed member 10 of the change-speed lever apparatus 1 is fixedly secured to a base 12, which is fixed to the handle bar 2, by tightening a first shaft 11 acting as a cylindrical support shaft via a tightening screw 13. The base 12, as illustrated in FIG. 1, is formed integrally and continuously with a bracket of a brake lever device 4 fixed to the handle bar 2.

Between the first shaft 11 and the base 12, there are provided a plurality of engaging projections and engaging recesses corresponding thereto, such that through a selective engagement between the same the first shaft 11 has its peripheral position variable relative to the base 12. At a leading end and outer peripheral surface of the first shaft 11, there are formed a plurality of concave grooves 14 and a threaded groove. Then, with a screw-engagement of a nut 15 into this threaded groove, the winding member 20 and a control lever element 41 are detachably supported to the first shaft 11. Further, at the concave groove 14 of the first shaft 11, there is provided a spring-receiver plate 16 for receiving, between the plate 16 and the winding member 20, a rewinding spring 21 for urging the winding member 20 in the rewinding direction. Reference numeral 17 denotes a bowl-shaped cover for covering the base end portions of the winding member 20 and the control lever 40.

Figure 4:
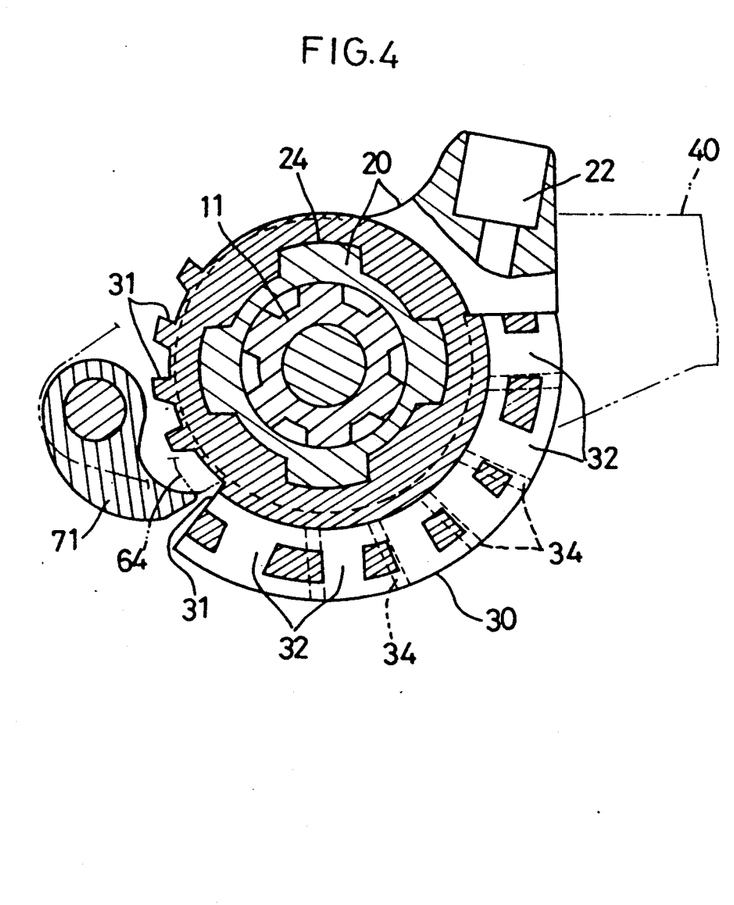
FIG. 4 is a partially cutaway cross section taken along a line 4—4 of FIG. 2 and showing the apparatus.

As shown in FIGS. 2 and 4, the winding member 20 is formed as a cylindrical structure having a cable-stopper portion 22 at one lateral side thereof and defines at an intermediate position in its outer periphery a cable-guide groove 23 formed continuously with the cable-stopper portion 22 and along the periphery of the winding member 20. Further, the winding member 20 includes, at one end thereof along the first shaft 11, an engaging portion 24 having a plurality of engaging projections disposed with a predetermined peripheral interdistance therebetween. Then, as this engaging portion 24 comes into engagement with one of the engaging hole of a disc-shaped positioning member 30 to be described later, the winding member 20 and this positioning member 30 come into unrotatable connection with each other.

The control lever 40 includes the control lever element 41 formed of a metal plate, a release lever element 42 formed also of a metal plate and a control portion 43 formed of a resin material and at the leading end of the release lever element 42. The control lever element 41 defines at an intermediate position thereof a first shaft hole 44 for engaging with the first shaft 11. Further, the lever element 41 forms, at one end thereof, a pair of connecting pieces 45 extending along the axial direction of the first shaft hole 44. Then, the release lever element 42 is pivotably supported to the connecting pieces 45 by a predetermined range via a second shaft 46 disposed normal to the axis of the first shaft hole 44. That is to say, as the first shaft 11 and the second shaft 46 are disposed normal to each other, with a horizontal pivotal operation on the control lever 40, the entire control lever 40 pivots only about the first shaft 11; whereas, with a vertical pivotal operation on the control lever 40, the release lever element 42 alone pivots about the second shaft 46.

Between the release lever element 42 and the control lever element 41, there is interposed a release lever spring 47 for urging the release lever element 42 in its return direction, such that the respective lever elements 41 and 42 are normally maintained at horizontal postures. Further, the release lever element 42 has its upper end face contacting a lower end face of the control lever element 41 thereby to set a home position of the release lever element 42.

Figure 3:
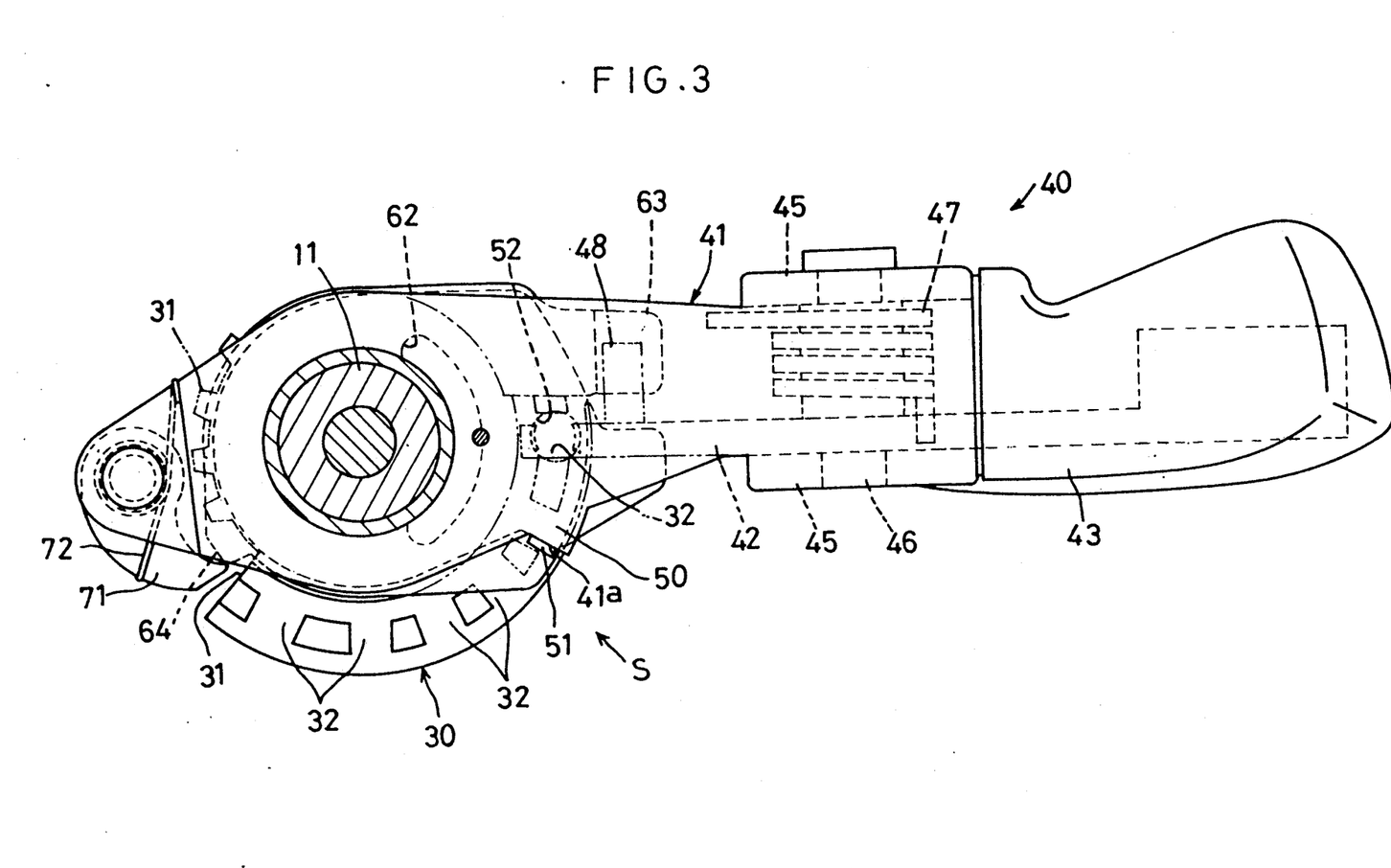
FIG. 3 is a plane view of the same.
Figure 6:
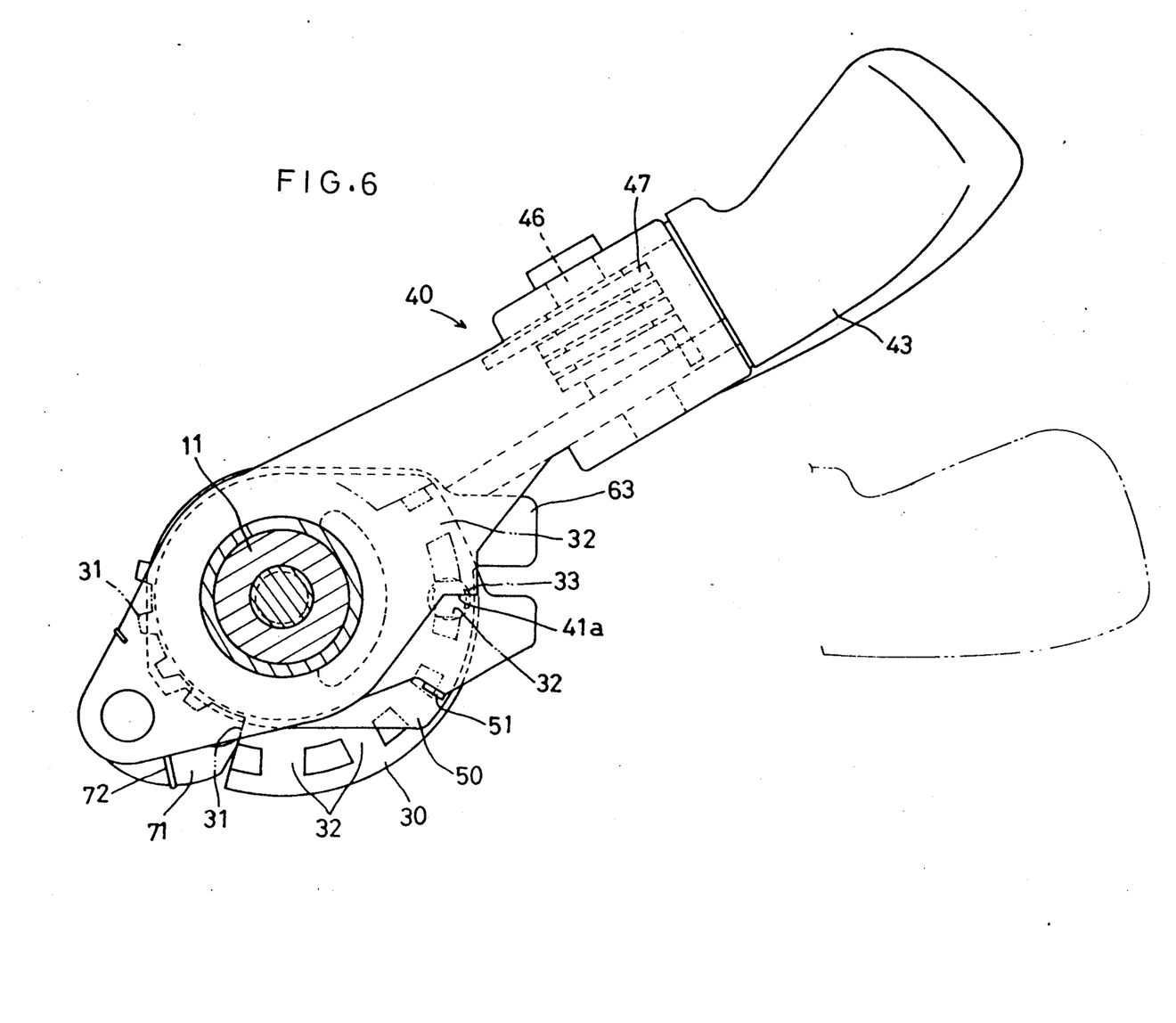

As shown in FIGS. 3 and 6, a position setting mechanism S is provided for setting a home position of the control lever element 41, in which mechanism a plate-type position setting element 50 having an upwardly projecting setting portion 51 is non-rotatably fitted on the first shaft 11, such that a contact portion 41a of the control lever element 41 urged by the lever spring 18 comes into contact with the setting portion 51 to be stopped at this home position. Incidentally, this setting portion 51 of the position setting member 50 is formed by bending a part of the position setting member 50.

As shown in FIGS. 2 through 6, a oneway mechanism W is provided between the positioning member 30 pivotable together with the winding member 20 and the control lever element 41 so as to permit pivotal motion of the winding member 20 only in the winding direction. More particularly, this oneway mechanism W pivotably supports, at one end of the control lever element 41, a claw-shaped transmitting element 71 and includes a claw spring 72 disposed between the transmitting element 71 and the control lever element 41 and adapted for unidirectionally urging the transmitting element 71 and further includes a plurality of peripherally dispersed transmitted portions 31 formed at a portion of the outer periphery of the positioning member 30 and adapted for transmitting a control force from the control lever element 41 as coming into engagement with the transmitting element 71 only with a return operation of the control lever element 41.

Further, as shown in FIGS. 2 and 3, there is provided a position maintaining mechanism P. This mechanism P includes concave portions 32 formed of a plurality of projections peripherally dispersed with a predetermined interdistance therebetween on the upside face of the positioning member 30 and a ball-shaped engaging member 33 for selective engagement with one of the concave portions 32, with the engaging member 33 being urged downwardly by means of a plate spring 60. The number of the concave portions 32 corresponds to the number of speed steps provided by the change-speed lever apparatus of the invention. The engaging ball member 33 has its movement regulated as being received into a through hole 52 defined in the position setting element 50, such that the engaging ball member 33 fixedly maintains the position of the winding member 20 as coming into engagement with one of the concave portions 32. The plate spring 60 includes a semi-spherical pressing portion 61 for receiving a part of the engaging ball member 33, with the ball member 33 being urged along the axis of the first shaft 11 by a bending arrangement of the plate spring 60 in the axial direction of the shaft 11. Also, the pressing plate spring 60 defines a peripherally elongated slot 62 adapted for allowing the deformation of this plate spring and formed at an intermediate postion between the engaging hole and the pressing portion 61.

For releasing the position-maintaining condition of the winding member 20 by the above-described position-maintaining mechanism P, there is provided a release mechanism R. This release mechanism R includes a release portion 48 formed at the leading end of the release lever element 42 and an abutment portion 63 formed by a part of the plate spring 60 projected in opposition to the release portion 48. This release portion 48, with a depressing operation on the release lever element 42, pushes up the abutment portion 63 to cause the plate spring 60 to elastically deform in the axial direction, thereby to weaken the pressing force on the engaging ball member 33 and consequently to permit a movement of this member 33 away from the concave portion 32. Further, the plate spring 60 includes a release cam 64 projected in opposition to the abutment portion 63 and for releasing the engagement between the transmitting element 71 and the transmitted element 31 when the control lever element 41 has returned to its home position.

Figure 5:
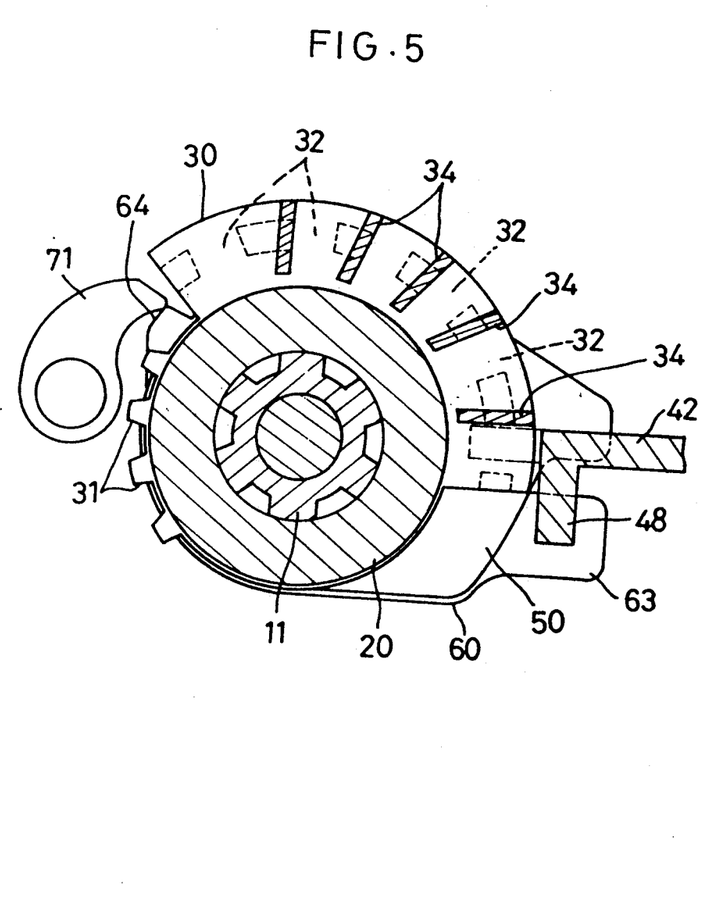
FIG. 5 is a partially cutaway cross section taken along a line 5—5 of FIG. 2, FIGS. 6 and 7 are views illustrating operational conditions.

As shown in FIGS. 2 and 5, a limiting mechanism L is provided for limiting the pivotal amount in the rewinding direction of the winding member 20 with a release operation of the release mechanism R to one pitch of the concave portions 32. This limiting mechanism L includes a plurality of stopper portions 34 projecting from the lower face of the positioning member 30 towards the outside in the direction of thickness of the same and stopper pieces 49 provided at the leading end of the release lever element 42 and extending downwardly relative to the stopper portions 34. These stopper pieces 49 are provided so as to correspond to the respective gaps between adjacent pairs of the concave portions 32. With a depressing operation on the release lever element 42, the stopper pieces 49 move in between adjacent pairs of stopper portions 34 to stop one of the same 34, thereby to limit the rewinding-direction-wise pivotal amount of the winding member 20 not to exceed one pitch of the concave portions 32.

Next, operations of the above-described construction will be specifically described.

FIG. 3 shows a highest speed condition, in which the control lever element 41 is urged by the lever spring 18 so that the contact portion 41a of this control lever element 41 is placed in contact with the setting portion 51 of the position setting member 50 whereby the entire control lever 40 is stopped at its home position.

First, from the above highest speed condition shown in FIG. 3, a speed reducing operation is carried out as follows.

When a thumb of the rider's hand holding the handle grip operates the control portion 43 of the control lever 40 to pivot the same counterclockwise in FIG. 3, as illustrated in FIG. 6, the transmitting element 71 comes into engagement with one of the transmitted elements 31 of the positioning member 30, thereby to transmit the forward control force from the control lever 40 to the winding member 20 via the positioning element 30. Then, as this winding member 20 is pivoted in the winding direction, the change-speed cable is pulled. In this operation, one step speed reduction is realized when the amount of the forward pivotal motion of the control lever 40 has reached one stroke amount corresponding to one pitch of the concave portions 32, and two steps speed reduction is realized when said amount has reached two strokes amount of the same. In this way, a change-speed operation up to three steps is possible stepwise or overridingly with a single thumb-using operation. For a change-speed operation over four steps, the control lever 40 is temporarily returned to its home position, then, the operation is possible stepwise or overridingly by again operating the lever 40 in the forward direction.

When the above operation is completed at the desired lower speed position, the engaging ball member 33 is engaged with the desired concave portion 32 as illustrated in FIG. 5 so as to prevent return pivotal movement of the winding member 20, whereby this low speed position may be maintained reliably. Further, when the engaging member 33 comes into engagement with the concave portion 32, the plate spring 60 elastically resiles to sharply decrease the load acting on the control lever element 41, and this sharp drop in the load provides a clicking feel to the rider's hand operating the lever element 41 for each change-speed operation. Accordingly, the rider may conveniently keep aware of his change-speed operation through the clicking feel.

After completion of the above-described change-speed operation, if the control portion 43 is released from the pressing force, the control lever element 41 pivotably returns (clockwise in FIG. 3) by the urging force of the lever spring 18, and as the contact portion 41a of the setting portion 51 come into contact with each other, the control lever 40 is returned and stopped at its home position ready for a next change-speed operation, as illustrated in FIG. 3.

As described above, if the lever apparatus is adapted for providing 5 to 6 speed steps, a change-speed operation from a high speed position to a low speed position is readily possible with the two steps horizontal: operations on the control lever 40 by using the rider's thumb.

Second, a change-speed operation from a low speed position illustrated in FIG. 6 to a high speed position will be particularly described.

Figure 7:
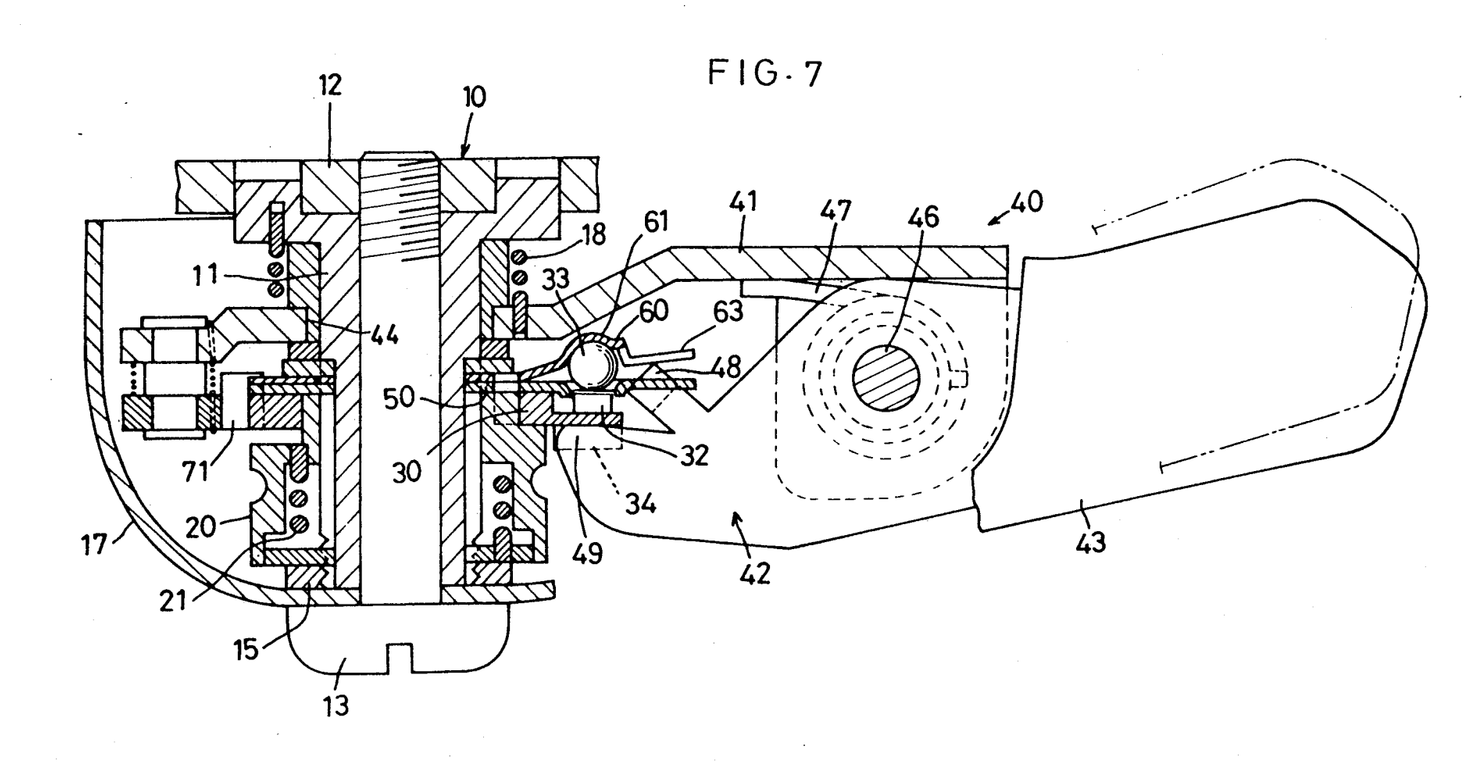

As illustrated in FIG. 7, with a downward pressing operation on the control portion 43 of the control lever 40 which is currently placed at its home position, the release portion 48 of the release lever element 42 pushes up the abutment portion 63 of the plate spring 60. With this release operation, the plate spring 60 elastically deforms along the first shaft 11 thereby to release the urging force applied on the engaging ball member 33. Then, the winding member 20, which has had its position released in the above manner, pivotably returns in the rewinding direction by the urging force of the rewinding spring 21. In this operation, as the engaging piece 49 of the release lever element 42 stops one engaging portion 34 of the positioning member 30, the pivotal amount of the return motion of the winding member 20 by the rewinding spring 21 is effectively limited so as not to exceed one pitch amount of the concave portions 32.

When the downward pressing on the control portion 43 is ceased, the release lever element 42 pivotably returns by the urging force of the release lever spring 47, thereby to release the engagement between the engaging piece 49 and the engaging portion 34. Simultaneously therewith, the plate spring 60 elastically resiles to urge the engaging ball member 33 towards the concave portion 32, and the winding member 20 and the positioning member 30 effect a further reverse pivotal movement by a small amount by the force of the rewinding spring 21, whereby the engaging ball member 33 comes into engagement with the concave portion 32 of one lower step position. As this engagement prevents a further reverse pivotal motion of the winding member 20 by the rewinding spring 21, this one-step-higher speed position may be reliably maintained. Further, in this case also, when the engaging member 33 comes into engagement with the concave portion 32, the pressing spring 60 elastically resiles to sharply decrease the load acting on the control lever element 41, and this sharp drop in the load provides a clicking feel to the rider's hand operating the lever element 41 for each change-speed operation.

As illustrated in FIG. 3, the returned release lever element 42 is stopped at its home position for a next change-speed operation, as contacting the control lever element 41. Then, if this release lever element 42 currently stopped at the home position is again pressed downwardly, in the same manner as described above, the engagement between the engaging ball member 33 and the concave portion 32 is released, and the winding member 20 pivotably returns by the force of the rewinding spring 21, thereby to again release the change-speed cable for a further change-speed operation into one-step-higher speed position.

ALTERNATE EMBODIMENTS

Some alternate embodiments of the present invention will be specifically described next.

(I) In the previous embodiment, the winding member 20 is pivotably returned by the force of rewinding spring 21. Instead, this member 20 may be returned by utilizing, e.g. the urging force of the derailleur spring attached to the derailleur. With this alternate arrangement, it becomes possible to eliminate the rewinding spring disposed between the winding member 20 and the spring receiver plate 16 of the fixed member 10.

(II) In the previous embodiment, the concave portion 32 and the engaging member 33 of the position maintaining mechanism P are opposed to each other in the axial direction of the first shaft 11. Instead, the same may be opposed to each other in the radial direction of this first shaft 11.

(III) It is conceivable to fixedly secure the positioning member 30 to the fixed member 10 while arranging the engaging member 33 so as to pivotable in unison with a pivotal motion of the winding member 20.

(IV) Of the positioning member 30 and the engaging member 33, it is conceivable to form fixing portions of the same integrally with the fixed member 10 while forming pivotal portions of the same integrally with the winding member 20.

Figure 8:
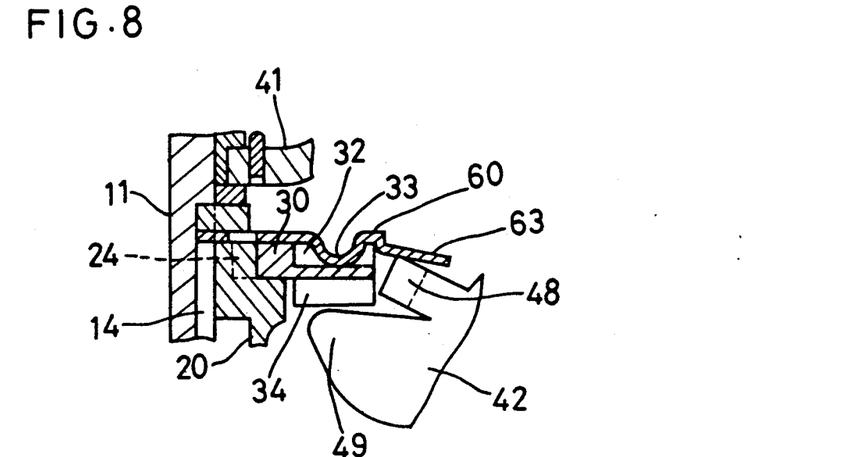
FIGS. 8 through 10 are views showing change-speed lever apparatuses according to alternate embodiments of the present invention, respectively.

(V) In place of the rolling element such as the ball type engaging member 33 employed in the previous embodiment, this engaging member 33 may be formed e.g. by effectively utilizing the pressing spring 60 as illustrated in FIG. 8. That is, in this arrangement, the pressing portion 61 of the pressing spring 60 is provided with a bulging part projecting towards the concave portions 32 and this bulging part acts as the engaging member 33.

Figure 9:
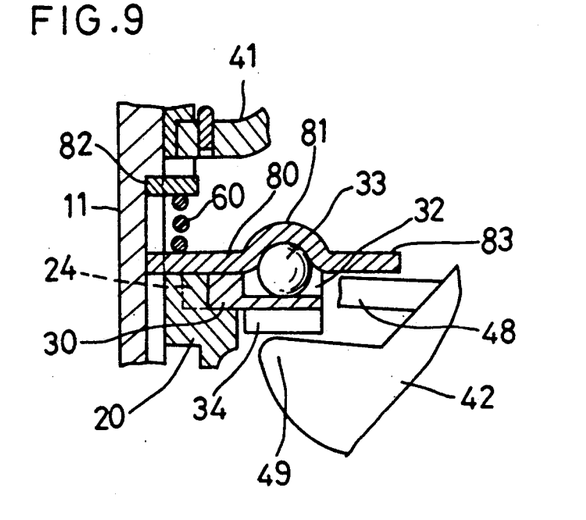

(VI) In the previous embodiment, the spring for pressing the engaging member 33 is formed of a plate type spring. Instead, as illustrated in FIG. 9, the same may be formed of a coil type spring 60a. In this case, the engaging member 33 is supported to a semispherical holding portion 81 of a disc type holding member 80, and the coil spring 60 is disposed between the holding member 80 and a spring receiver 82 of the first shaft 11, such that the coil spring 60a may be elastically deformed with a movement of the holding member 80 in the axial direction of the first shaft 11 by an operation on the release lever element 42.

Further, in this arrangement of FIG. 9, for example, an abutment portion 83 is provided in the outer periphery of the holding member 80 while the release lever element 42 is provided with a fork-shaped release portion 48 contactable with the abutment portion 83.

Figure 10:
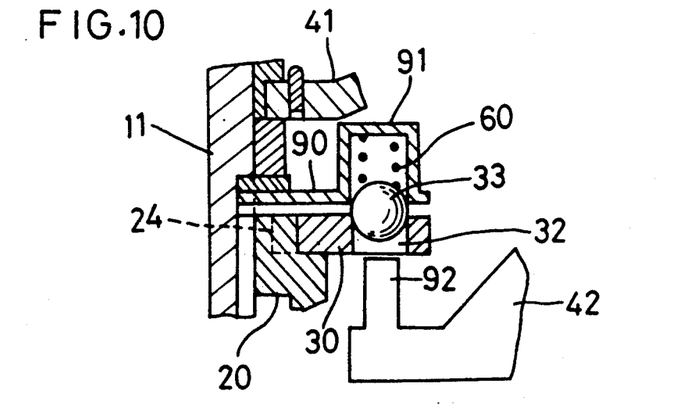

(VII) If the coil type spring 60b is employed as the spring for pressing the engaging member 33, as illustrated in FIG. 10, the first shaft 11 supports a holding member 90 having a bottom-equipped holding portion 91 for receiving the engaging member 33, with the holding portion 91 holding the engaging member 33 and the coil spring 60b, and the engaging portion 32 is formed of a through hole. Whereas, the release lever element 42 includes, in place of the release portion 48 and the stopper piece 49, a projecting release stopper piece 92 insertable into one of the respective engaging portions 32. Thus, with a forward operation on the release lever element 42, the release stopper piece 92 is inserted into the respective engaging portions 32, such that one of these control portions releases the engagement between the engaging member 33 and one of the engaging portions 32 and then the winding member 20 is returned by the urging force of the rewinding spring 21.

(VIII) In the previous embodiment, the release lever element 42 in the release mechanism R and the limiting mechanism L is pivotably supported to the control lever element 41. Instead, the release lever element 42 may be pivotably supported to the side of fixed member 10.

(IX) In the previous embodiment, the release mechanism R and the limiting mechanism L include the release lever element 42. Instead, it is also conceivable to eliminate this release lever element 42 and to provide the first shaft hole 44 of the control lever element 41 with a play for the first shaft 11, such that the hole 44 may incline toward the axial (i.e. vertical) direction of the shaft 11. Still alternately, the control lever element 41 may support a control pin or control lever urged towards its returning direction by means of a spring, such that this control pin or control lever may act on the control lever element 41 to cause the plate spring 60 to elastically deform, thereby moving the engaging member 33 to release the engagement between this engaging member 33 and the concave portion 32. Varied and many other modifications in the construction of the release mechanism R and limiting mechanism L would be obvious for those skilled in the art.

(X) In the previous embodiment, in a change-speed operation from a low speed position to a higher speed position, the engaging piece 49 of the release lever element 42 comes into engagement, for each of the concave portions 32, with the stopper portion 34 so as to limit the amount of return motion of the winding member 20, whereby the release lever element 42 must be operated in the forward direction by a plurality of steps which number corresponds to the number of steps of the change-speed operation. Instead, it is also conceivable to eliminate the engaging portion 34 of the limiting mechanism L and to control the degree of engagement between the engaging member 33 and the concave portion 32 by varying the amount of operation on the release lever element 42, such that the winding member 20 may be pivoted stepwise or through a plurality of steps at one time, for the change-speed operation.

(XI) The setting portion 51 for the setting the home position of the control lever element 41 may be formed integrally with the fixed member 10.

(XII) The base 12 may be directly fixed to the steering handle bar 2 though a band element or without the same.

(XIII) The change-speed lever apparatus of the present invention may be used also with a front derailleur, instead of the use with the rear derailleur.

(XIV) The oneway mechanism W employed in the previous embodiment includes the claw-shaped transmitting element 71 and the transmitted portion 31 defined in the outer peripheral face of the positioning member 30. Alternately, the oneway mechanism W may utilize a friction force.

(XV) In the previous embodiment, the control lever element 41 shares the same pivot shaft 11 with the winding member 20. Instead, the the pivot shaft 11 of the former may be provided independently of that of the latter.

(XVI) The attaching orientation of the first shaft 11 is not limited to the vertical direction disclosed in the previous embodiment. This shaft 11 may be attached with any orientation most convenient for the rider's thumb or some other finger to operate the control lever 40 when his hand grips the grip portion 3. For instance, the easy operation is also possible by disposing the first shaft 11 parallel with the axial direction of the steering handle bar 2 while disposing the second shaft 46 along the travelling direction of the bicycle.

(XVII) The extending position of the control lever 40 may vary depending on the extending direction of the grip portion 3. For instance, if the longitudinal axis of the grip portion 3 of the handle bar 2 is aligned with the travelling direction of the bicycle, the interdigital areas of the rider's hand gripping the grip portion 3 are positioned on the outside face of the grip portion 3 along the outerside of the bicycle body. Thus, in this case, the control lever 40 may extend on the innerside face of the grip portion 3 facing the rider.

(XVIII) The change-speed lever apparatus used in the bicycle steering handle apparatus of the present invention is not limited to those with the constructions described in the above embodiments.

What is claimed is:

1. A steering handle apparatus for use in a bicycle, said apparatus comprising:
   a handle bar including a grip portion provided with a contact portion for contacting interdigital areas of a hand;
   a change-speed lever apparatus attached in a vicinity of the grip portion of the handle bar, said change-speed lever apparatus including
      a winding member for effecting a change-speed operation by winding a cable,
      a control lever supported to said handle bar to be pivotable about a first shaft (11) extending substantially normal to a longitudinal axis of said handle bar, said control lever effecting a change-speed operation by being rotated about said first shaft (11) thus rotating the winding member, said control lever being returned to a predetermined home position thereof by urging means with every change-speed operation,
      a position-maintaining mechanism for maintaining a position of the winding member in multiple steps, and
      a release mechanism for releasing the position of the winding member by the position-maintaining mechanism;
      said control lever being disposed to extend toward the grip portion on a side of the handle bar opposed to the interdigital area contact portion, said forward operation on the control lever being effected in a direction aligned with a bending direction of the rider's thumb when gripping the grip portion, said control lever actuating said release mechanism by being pivoted about a second shaft (46) extending substantially normal to said first shaft 11.

2. A steering handle apparatus as defined in claim 1, wherein said second shaft (46) is provided at an intermediate position of said control lever (40).

3. A steering handle apparatus as defined in claim 2, wherein the change-speed lever apparatus further includes a limiting mechanism for limiting a rotation amount of the winding member with an operation of the control portion of the release mechanism to a predetermined amount.

4. A steering handle apparatus as defined in claim 3, wherein said limiting mechanism includes a plurality of stopper portions, and stopper pieces movable into spaces between the stopper portions via the operation of the control portion of the release mechanism thereby to limit the rotational amount of said winding member to one successive stepwise engagement by said position-maintaining mechanism.

5. A steering handle apparatus as defined in claim 1, wherein said handle bar is formed as a flat-type handle bar, and said control lever is positioned downwardly of the handle bar.

6. A steering handle apparatus for use in a bicycle, said apparatus comprising:
   a handle bar including a grip portion provided with a contact portion for contacting interdigital areas of a hand;
   a brake lever attached in a vicinity of the grip portion of the handle bar and operable by fingers of a hand gripping said grip portion; and
   a change-speed lever apparatus attached in a vicinity of the grip portion of the handle bar, said change-speed lever apparatus including
      a winding member for winding a change-speed cable,
      a control lever supported to said handle bar to be pivotable about a first shaft (11) extending substantially normal to a longitudinal axis of said handle bar, said control lever effecting a change-speed operation by being rotated about said first shaft (11) thus rotating the winding member, said control lever being returned to a predetermined home position thereof by urging means with every change-speed operation,
      a position-maintaining mechanism for maintaining a position of the winding member in more than three steps,
      a release mechanism for releasing the position of the winding member by the position-maintaining mechanism; and
      a limiting mechanism for limiting a rotation amount of the winding member with an operation of said control portion of the release mechanism to a predetermined amount not exceeding one successive step of said position-maintaining mechanism,
   wherein said control lever is disposed to extend toward the grip portion on a side of the handle bar opposed to the interdigital area contact portion and at a position operable by a thumb of the hand gripping said grip portion, said forward operation on the control lever being effected in a direction aligned with a bending direction of the rider's thumb when gripping the grip portion, said release mechanism includes a control portion disposed in the same side as the control lever with respect to the handle bar and at a position operable by the rider's thumb, said control lever actuating said release mechanism by being pivoted about a second shaft extending substantially normal to said first shaft.

7. A steering handle apparatus as defined in claim 6, wherein a forward operating direction of said brake lever and a forward operating direction of said control lever are substantially opposite to each other.

8. A steering handle apparatus as defined in claim 6, wherein said limiting mechanism includes a plurality of stopper portions, and stopper pieces movable into spaces between the stopper portions via the operation of the control portion of the release mechanism thereby to limit the rotational amount of said winding member to one successive stepwise engagement by said position-maintaining mechanism.

9. A steering handle apparatus as defined in claim 8, wherein said handle bar is formed as a flat-type handle bar, and said control lever is positioned downwardly of the handle bar.

* * * * *